US011667525B2

(12) United States Patent
Liao (10) Patent No.: US 11,667,525 B2
(45) Date of Patent: Jun. 6, 2023

(54) PETROLEUM SLUDGE OR OTHER WASTES RECYCLE TREATMENT SYSTEM

(71) Applicant: InfiniForce, Inc., Rancho Palos Verdes, CA (US)

(72) Inventor: Ming-Chen Liao, Rancho Palos Verdes, CA (US)

(73) Assignee: INFINIFORCE, INC., Rancho Palos, CA (US)

( * ) Notice: Subject to any disclaimer, the term of this patent is extended or adjusted under 35 U.S.C. 154(b) by 399 days.

(21) Appl. No.: 16/928,758

(22) Filed: Jul. 14, 2020

(65) Prior Publication Data

US 2021/0017022 A1 Jan. 21, 2021

Related U.S. Application Data

(60) Provisional application No. 62/874,664, filed on Jul. 16, 2019.

(51) Int. Cl.
*C01B 3/24* (2006.01)
*C01B 3/00* (2006.01)

(52) U.S. Cl.
CPC .............. *C01B 3/24* (2013.01); *C01B 3/0073* (2013.01); *C01B 2203/0272* (2013.01);
(Continued)

(58) Field of Classification Search
CPC . C01B 3/24; C01B 3/0073; C01B 2203/0272; C01B 2203/085;
(Continued)

(56) References Cited

U.S. PATENT DOCUMENTS 3,871,839 A * 3/1975 Moody ................. C10J 3/54
48/210
2009/0077889 A1* 3/2009 Duca ................... C21B 11/10
48/92

FOREIGN PATENT DOCUMENTS

WO WO-2008011213 A2 * 1/2008 ............. C03B 5/005

* cited by examiner

*Primary Examiner* — Steven J Bos
*Assistant Examiner* — Syed T Iqbal
(74) *Attorney, Agent, or Firm* — Chun-Ming Shih; HDLS IPR Services (57) ABSTRACT

The invention relates to petroleum sludge or other wastes recycle treatment system, which comprises a pre-treatment operation facility for a treated matter to be treated as a raw material. A feeding unit is arranged to feed the raw material into at least one gasification reactor with a push rod or a screw for pyrolysis gasification. The upper half of the at least one gasification reactor is provided with a syngas collecting pipe which can be connected with a gas collecting pump, and the lower half is provided with a liquid petroleum output pipe and an ash residue outlet, in which the ash residue outlet can be provided with a spiral pipe to draw the ash residue out. The petroleum sludge and other wastes in a dense fluid state are transported from a raw material tank to the at least one gasification reactor end which is bent upward through at least one pipe body, and the feeding mode of pyrolysis gasification of the raw material from below to upper of the gasification reactor is adopted. The top of the at least one gasification reactor is provided with a syngas collecting pipe, and the other side is provided with an ash residue accumulation chamber. The ash residue can be centralized and discharged through the lower buffer chamber and the slag discharge chamber, so as to convert the petroleum sludge or other wastes into more energy-efficient syngas (Continued)

providing human beings as users of electric or thermal energy.

4 Claims, 6 Drawing Sheets

(52) U.S. Cl.
CPC ............... *C01B 2203/085* (2013.01); *C01B 2203/1235* (2013.01); *C01B 2203/1276* (2013.01); *C01B 2203/16* (2013.01); *C01B 2203/82* (2013.01); *C01B 2203/84* (2013.01)

(58) Field of Classification Search
CPC .... C01B 2203/1235; C01B 2203/1276; C01B 2203/16; C01B 2203/82; C01B 2203/84; C01B 2203/0266; C01B 2203/066; Y02E 60/32; Y02P 20/10
See application file for complete search history.

PETROLEUM SLUDGE OR OTHER WASTES RECYCLE TREATMENT SYSTEM

BACKGROUND OF THE INVENTION

1. Field of the Invention

The invention relates to a treatment system for renewable substances such as petroleum sludge or other wastes, particularly to design high frequency electromagnetic heating technology to gasify petroleum sludge or other wastes into syngas for the purpose of using renewable energy of artificial gas to promote circular economy.

2. Description of the Prior Art

The cycle treatment of petroleum sludge and other wastes has always been a very troubling problem for environmental protection departments at all levels, owners and the public. At present, besides sort, recycle and reuse, garbage waste is directly buried or sent to incinerators for incineration. The petroleum sludge is being studied, tested and crushed with rice straw, wheat stem and other solids, solidified into granular form to become a RDF-5 (Refused-Derived Fuel) with calorific value, and then used as a heat source for boilers and so on.

SUMMARY OF THE INVENTION

The invention provides a novel petroleum sludge or other wastes recycle treatment system, which utilizes the principle of high frequency heating, that is, dielectric heating or induction heating can respectively heat conductors and non-conductors, i.e., the generic name of radio frequency heating mode, in which non-conducting substances such as petroleum sludge or waste can be placed in the reactor as raw materials. High-frequency heater is used to make the raw materials in the reactor produce high temperature from the wall of the reactor piping and the mixer in the reactor due to the action of electric field. By conducting high temperature to the raw material in the reactor, the raw material can be heating up in a very short time, and the raw material in the reactor can be directly pyrolyzed and gasified into syngas and a small amount of liquid fuel and ash residue.

The system of the invention is that the thermal energy generated by the reactor itself is transmitted to the heated petroleum sludge or waste, thus besides uniform and rapid heating, the system has high efficiency and can save a large amount of energy.

According to the research, the compositions of petroleum sludge have three main categories, namely, water, inorganic solids and hydrocarbons. According to the statistics from the International Energy Administration, all organic substances produced by organisms, agricultural and animal husbandry wastes, urban garbage, sewage sludge and biogas are defined as biomass energy substances, which is the fourth largest energy source after petroleum, coal and natural gas. Moreover, as long as human civilization exists, it is an inexhaustible renewable energy source, which is indeed a precious resource worthy to be exploited and utilized.

The invention provides petroleum sludge or other wastes recycle treatment system, comprising a pre-treatment operation facility for petroleum sludge or waste (hereinafter referred to as the treated matter), which is at least a preliminary treatment unit; that is, a facility for general pre-treatment, such as washing or stirring or drying or treating into fluids, etc. After the preliminary pre-treatment unit, crushing facilities or facilities for solidification or treating into a fluid state can be equipped to make the treated matter become the raw material to be treated or RDF-5 or dense fluid, and concentrate on the raw material stacking site, tank or bagging temporarily. Then the feeding unit can be provided, depending on its solid state or fluid state, which can be as follows: solid state, which can include various feeding facilities such as conveying facilities or buckets to feed RDF-5 or raw material to the raw material hopper. Raw material hopper is provided with at least one discharging outlet and connected with at least one feeding pipe, in which the feeding pipe is closed type with push rod or screw feeding. Each of the at least one feeding pipe is connected to each of the at least one reactor with an angle of θ. According to the physical phenomena of heating up and cooling down, the angle of θ is preferable to be an acute angle, which can reduce the high heat of the reactor entering into the feeding pipe. However, it can also design socketed thermal insulating pipe and set up heat dissipating fins or water cooling system to avoid the high heat affecting feeding as far as possible, so that feeding pipe and reactor can also be joined at obtuse angle or right angle. At least one high frequency (i.e. radio frequency) heater; the upper half of the at least one gasification reactor is provided with a syngas collecting pipe, which can be connected with a gas collecting pump; the lower half is provided with a liquid petroleum output pipe and an ash residue outlet, in which the ash residue outlet can be provided with a spiral pipe to draw the ash residue out.

In order to create an oxygen-controlled environment for gasification reactor, automatic control or manual airtight locking components or vacuum wells/pumps can be installed in the system consisting of feeding pipe, gasification reactor and ash residue, liquid petroleum output pipe and pyrolysis oxidation reactor, so that the vacuum wells/pumps are used to assist in pumping out the atmosphere to control the entry of oxygen and other gases into the reactor to participate in pyrolysis gasification reactions. Further, in order to keep the gasification reactor operating for a long time, the mixer with conductor material, such as screw or rotary blade, can also be installed in the inner chamber of the reactor. In addition to making the conductor mixer form vortex as a heat source, it can also agitate the raw materials and scrape off the ash residue in the inner wall of the reactor. In addition to maintaining the volume of the pyrolysis reactor, it can jointly with the reactor wall heat source to form the function of "heating the raw materials both inside and outside", which can greatly improve the efficiency of the pyrolysis reaction. The mixer can be set automatically or manually as needed.

In order to further improve efficiency, the three major parts of the invention, i.e. feeding, pyrolysis gasification and slag discharging can be formed in one body or arranged in a combined structure with materials or components such as thermal insulating gaskets, flanges, thermal insulating pipes, heat dissipation fins or water cooling systems, so as to avoid the high temperature being transferred to feeding pipe and slag discharging pipe during operation of the gasification reactor.

The invention can also be designed as a mobile and maneuverable unit to provide an independent power supply unit. Take home or block-house in remote areas as an example, which can solve the problems of garbage and electricity consumption at the same time. Even if the amount of garbage or kitchen waste produced by one is insufficient, waste such as dead branches and leaves can be picked up as raw materials, and then the heat source of electricity or artificial gas can be obtained.

In addition, the system of the invention can be designed and installed on a vehicle, and the syngas obtained by the system can be further purified and supplied to the gas engine or fuel cell for use, so as to provide more perfect driving energy for the vehicle.

As for the raw materials in a fluid state, such as petroleum sludge, the invention breaks through the traditional idea of adopting bottom-up feeding method for petroleum sludge or other waste treatment. Because the petroleum sludge is a dense fluid, the petroleum sludge or waste can be gasified by using the principle of connecting pipe or using a pump to push petroleum sludge or fluid waste into the reactor for pyrolyzing at high temperature. That is to say, petroleum sludge or wastes in a dense fluid state are placed in the pipeline of the system, and the two ends of the pipeline are respectively arranged as the feeding end and the reactor end, between which is the structure of the connecting pipe. The reactor end extends upwards, while the raw material is input from the bottom to the top, wherein a filter can be set at the end of the reactor to reduce the mixing of ash residue into the raw material after pyrolysis reaction and to form vortex phenomenon, so as to achieve the same internal and external heating effect as described above; the feeding end can be a tank body or the pipeline is connected with the pump to the raw material tank. The bottom-up configuration of the reactor end is pipe body, cooling zone and heating zone. One side of the top of the heating zone is the slag discharge side, and the other side is the bulkhead extending upward. A closed chamber is connected to the slag discharging side as an ash residue accumulation chamber, and a buffer chamber and a bottom slag discharge chamber are arranged at the lower part of the ash residue accumulation chamber to connect the slag outlet/pipe with the outside. As mentioned above, heat dissipation fins or water cooling facilities can be installed in the ash residue accumulation chamber and the slag discharge side, etc.

Thus, the method of the invention can have the oxygen-controlled environment for pyrolyzing the petroleum sludge and other wastes of dense fluid at high temperature. Because both petroleum sludge and other wastes of dense fluids have certain air tightness, when the above-mentioned raw materials enter the pipeline from the feeding end, whether connected pipe structure or pushed by a pump, the system and the outside have formed a blocking state and the atmosphere cannot enter the system, thereby forming an excellent closed control. This bottom-up feeding method can not only create a closed oxygen-controlled environment skillfully, but also continuously feed and save a lot of action of the system. It is indeed a breakthrough in petroleum sludge and other wastes recycle treatment technology.

It must be pointed out that if the system is set up by the concept of connecting pipe, when the pyrolysis of petroleum sludge and other raw materials is carried out gradually, the matched feed rate at the feeding end should be in accordance with the pyrolysis progress of the raw material by the system, so as to maintain the pressure and mass balance between the reactor end and the feeding end. Only in this way, the raw material in the pipeline can be pushed upward gradually to the heating zone, and the continuous pyrolysis reaction treatment can be carried out to keep the system in operation. In addition, it is worth mentioning that a gas collecting pipe/outlet should be installed at the top of the reactor end to transfer the syngas obtained from the pyrolysis of the petroleum sludge and other raw materials to the subsequent treatment facilities, such as gas collecting tank and purification tank, etc.

Here, another ingenious design can provide the ash residue after pyrolysis reaction of petroleum sludge and other raw materials to be automatically moved to the other side of the ash residue accumulation chamber. That is to say, install another suction pipe beside the top of the gas collecting pipe/outlet or bifurcate out from the gas collecting pipe to direct the syngas into the interior of the reaction zone. After the pyrolysis reaction is completed gradually from the bottom to the top, the ash residue is pushed upward and blown directly into the ash residue accumulation chamber, so as to avoid the ash residue accumulation upward to form the blockage of the gas collecting pipe/outlet. The suction pipe can be equipped with an additional high temperature pump to ensure the efficiency of soot blowing. The syngas from the suction and blowing treatment can eventually return to the subsequent treatment facilities, such as gas collecting tanks and purification tanks, etc. Through the gas collecting pipe/outlet. In this way, the system does not need to set up other mechanisms to clean up the ash residue, so as to avoid redundant mechanical actions, which may increase the risk of system airtightness damage.

| Reference Signs | |
|---|---|
| 100 | gasification reactor |
| 110 | heating zone |
| 111 | cooling zone |
| 120 | ash residue zone |
| 130 | slag discharging pipe |
| 131 | slag discharging screw conveyor rod |
| 140 | petroleum drain port |
| 141 | petroleum collecting pipe |
| 150 | petroleum collecting tank |
| 160 | mixer |
| 161 | mixer motor |
| 170 | vacuum well/pump |
| 180 | ash residue accumulation chamber |
| 181 | closing valve |
| 182 | buffer chamber |
| 183 | slag discharge chamber |
| 184 | slag outlet |
| 200 | feeding pipe |
| 210 | feeding screw conveyor rod |
| 220 | feeding pipe |
| 221 | feeding pump |
| 222 | feeding pipe |
| 223 | discharging pipe |
| 230 | support |
| 300 | high frequency heater |
| 400 | syngas collecting pipe |
| 410 | gas collecting tank |
| 430 | pressure control valve/joint |

-continued

| Reference Signs | |
|---|---|
| 440 | safety valve/gas supply pipeline unit |
| 450 | suction pipe |
| 451 | pressurization facility |
| 500 | central control unit |
| 510 | purification unit |
| 520 | gas engine |
| 530 | generator set |
| 540 | liquid fuel treatment unit |
| 550 | burner |
| 600 | raw material pile |
| 610 | raw material |
| 611 | treated matter |
| 620 | ash residue zone |
| 621 | ash residue barrel |
| 630 | petroleum |
| 640 | raw material tank |
| 650 | petroleum sludge tank |
| 700 | flange joint |
| 710 | thermal insulating gasket |
| 800 | raw material hopper |
| 810 | conveyor belt |
| 811 | conveying mechanism |
| 820 | control valve |
| 900 | mobile gasification generator set |
| 910 | starting power unit |
| 920 | crusher |
| 930 | charging unit |
| 940 | fuel cell |

DETAILED DESCRIPTION OF THE PREFERRED EMBODIMENTS

Figure 1:
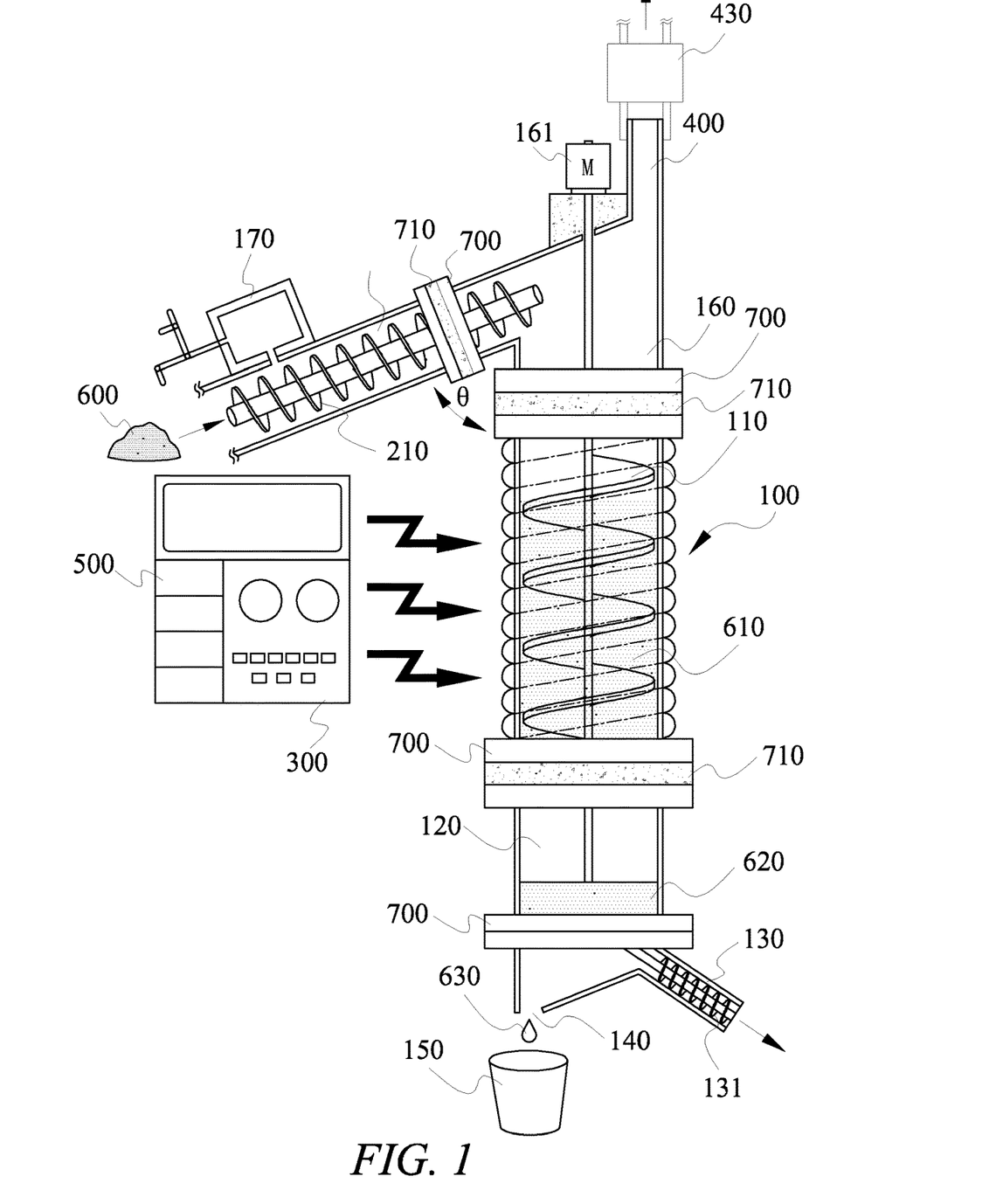
FIG. 1 is a schematic diagram of the gasification reactor of the invention.

Referring to FIG. 1, this embodiment illustrates a system comprising of three main parts of feeding, gasification reactor set and slag discharging, which are combined by flange joints. After the central control unit 500 is started by power supply, the raw material of raw material pile 600 is fed into gasification reactor 100 by feeding screw conveyor rod 210 of feeding pipe 200. The gasification reactor 100 is a hollow design, covered with quartz and other insulators, and then coated with insulated cotton (not shown) to maintain the high temperature of the gasification reactor 100 as far as possible to save energy. After the raw material enters, it gradually accumulates from the bottom to the top due to gravity. Once the stacking height of the raw material reaches to fill up the heating zone 110, the central control unit 500 will issue heating instructions and start the high frequency heater 300, so that the raw material in the heating zone 110 will be heated up rapidly by conducting high heat from gasification reactor 100 to its interior, and the temperature will rise to the rated temperature in a very short time, resulting in pyrolysis gasification reaction. The syngas obtained from the gasification reaction can be further treated and used through the syngas collecting pipe 400 and the pressure control valve/joint 430 into the collection tank (not shown). By the way, in the embodiment, during the initial start-up of the raw material entering the gasification reactor 100, because the raw material stacked in the lower ash residue zone 620 of the gasification reactor 100 does not involve in the pyrolysis gasification reaction, the remains unchanged raw material in the lower ash residue zone 620 accompanied with the ash residue produced by the pyrolysis gasification reaction will be withdrawn from the slag discharging screw conveyor rod 131 in the slag discharging pipe 130 connected below the slag outlet after the instruction is given by the central control unit 500, but this is only the case in the initial operation. In addition, when the system reacts with the raw material by the pyrolysis oxidation reaction, a part of the liquid petroleum 630 product will be produced simultaneously. The liquid petroleum 630 will be directly converging into the petroleum collecting tank 150 from the petroleum drain port 140 below the reactor body, or the liquid petroleum 630 will be discharged by mixing with the ash residue for further treatment or utilization.

It is worth mentioning that the gasification reactor in this embodiment is equipped with automatic control or manual air-tight components or vacuum well/pump 170, which enables the system to be used for pyrolysis reaction in an oxygen-controlled environment. In addition, the embodiment is also provided with a feeding pipe 200 and a heating zone 110 at the upper part, and an ash residue zone 120 and a slag discharging pipe 130 at the lower part, respectively. Flange joints 700 can be consolidated between the zones to form a combined structure to facilitate maintenance or components replacement. The flange joints 700 can be equipped with thermal insulating gasket 710 to maintain the thermal conduction effect of the heating zone 110. The structure of the feeding pipe 200 at the upper part and the ash residue zone 120 at the lower part can also be made of thermal insulating materials. It can also be equipped with heat dissipating fins or water cooling systems to effectively control high temperature thermal conduction. Further, in order to avoid carbon deposition or slag scale on the wall of the gasification reactor 100, a mixer 160 is also provided in this embodiment. The mixer 160 can be automatically or manually operated, and the mixer motor 161 can be automatically started by the central control unit 500 under certain conditions to mix raw material in a timely manner. At the same time, the fouling on the reactor wall can be cleaned up to ensure the volume of the gasification reactor 100. Because the mixer 160 is made of a conductor material, when the high frequency heater 300 is started, the mixer 160 can generate vortex heating to form another heat source in the gasification reactor 100, so that the raw material can be heated both inside and outside by the wall of the gasification reactor 100 and the mixer 160 simultaneously, thereby improving the efficiency of pyrolysis gasification.

Figure 2:
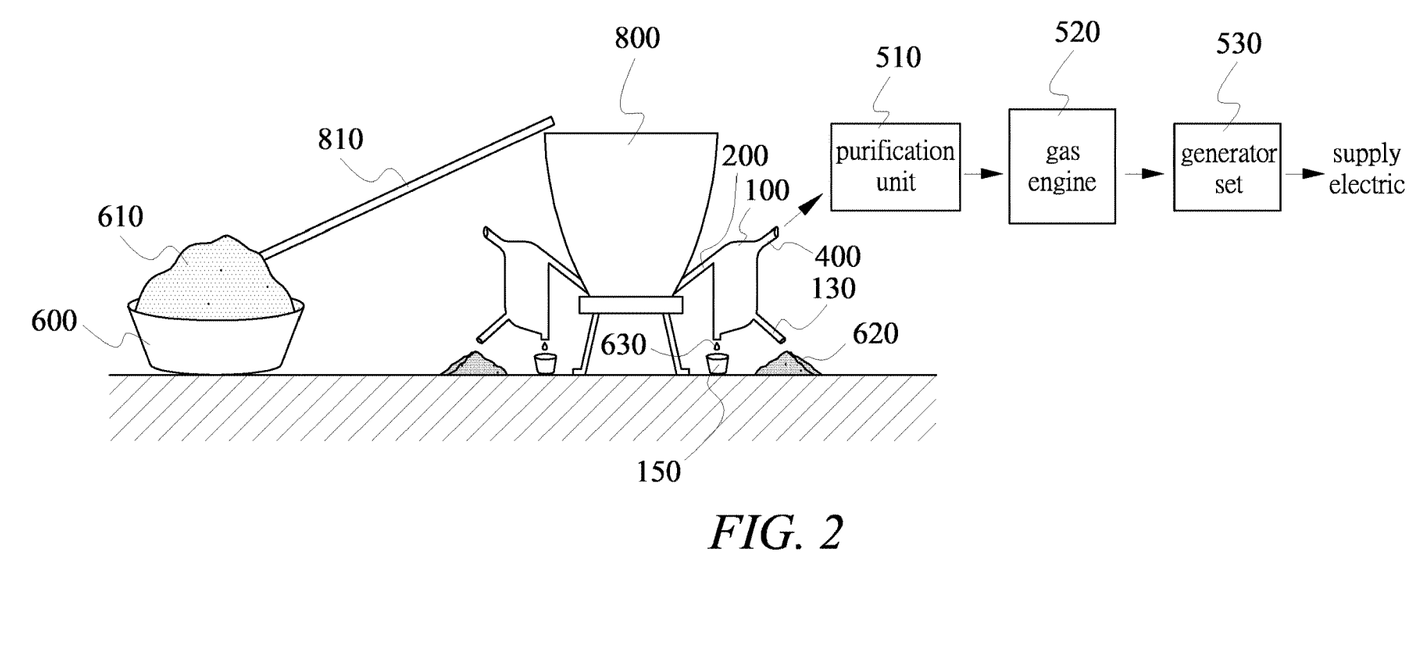
FIG. 2 is a schematic flowchart of the invention.

Referring to FIG. 2, this embodiment illustrates a schematic flowchart of the invention. RDF-5 raw material 610 in a raw material pile 600 is transported to a raw material hopper 800 through a conveyor belt 810, and the feeding pipe 200 under the raw material hopper 800 feeds the raw material 610 into the gasification reactor 100. During the gasification reaction of the system, syngas, some petroleum products and ash residue can be obtained, which are transported from a syngas collecting pipe 400 to a purification unit 510, respectively. The purified syngas can be supplied to the gas engine 520 to generate mechanical energy, which is used to drive the generator set 530 to output electricity. The by-product petroleum 630 can be converging into the petroleum collecting tank 150 through a petroleum collecting pipe 141 for further treatment and utilization, while the ash residue is concentrated in the ash residue zone 620 through the slag discharging pipe 130 for further treatment and utilization.

Figure 3:
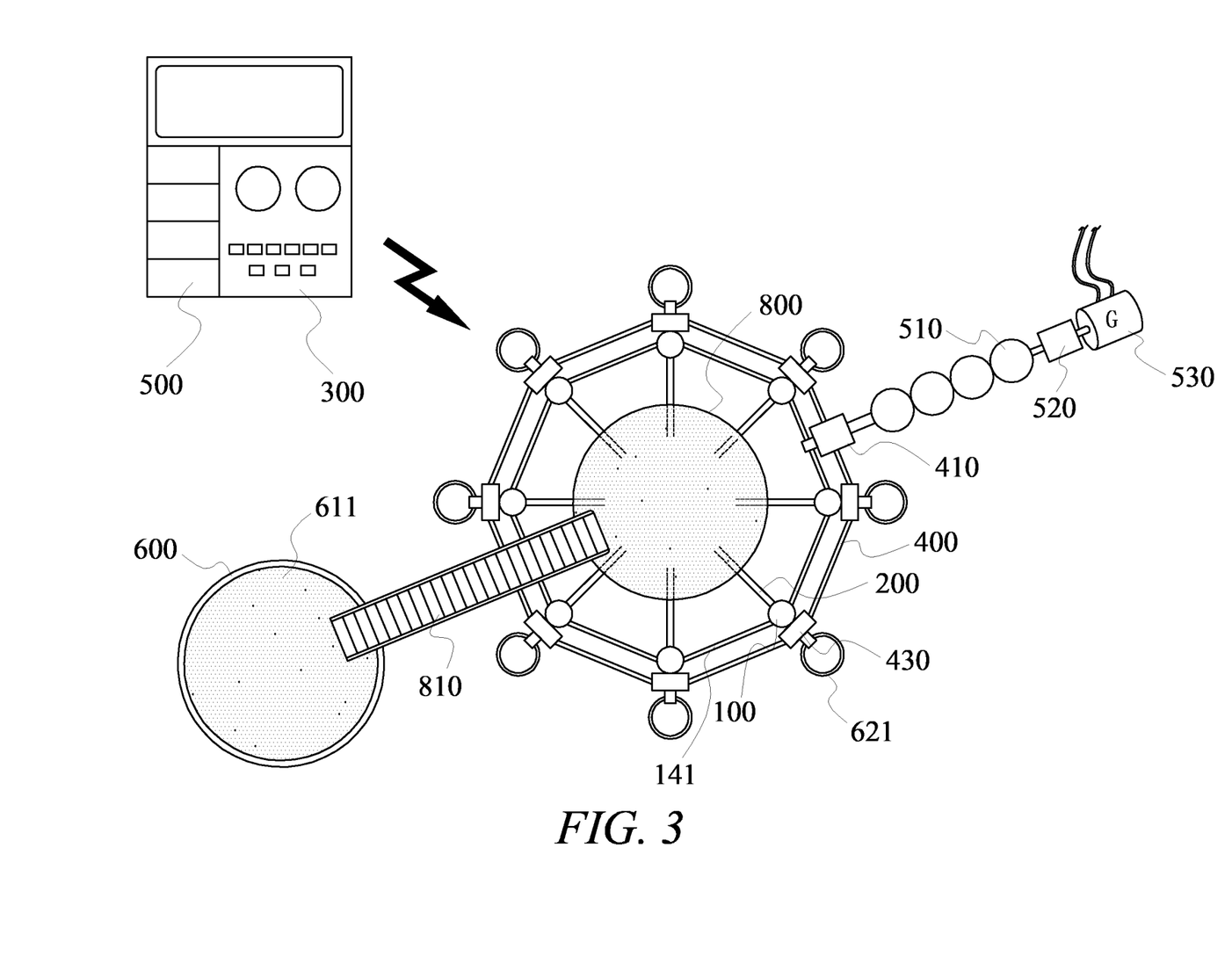
FIG. 3 is a schematic diagram of an embodiment with a radial configuration of the invention.

Referring to FIG. 3, this embodiment illustrates a relatively large-scale application. A large amount of treated matter 611 (i.e. raw material) is transported to the raw material hopper 800 through the conveyor belt 810. The raw material hopper 800 is equipped with plural feeding pipes 200, each of which is connected with the corresponding gasification reactor 100 at an appropriate angle. After the start-up instruction is issued by the central control unit 500, the conveyor belt 810 transports the treated matter 611 to the raw material hopper 800 from the raw material pile 600, and the raw material within the raw material hopper 800 is injected into the connected gasification reactor 100 through the feeding pipes 200 with radial configuration, respectively. When the gasification reactor 100 is injected with a certain amount of raw material, the central control unit 500 then makes the high frequency heater 300 to heat the gasification reactor 100 again, and pyrolyzes the structure of the original larger molecule into smaller molecule at high temperature to form gasification reaction. In this way, various phase substances of syngas, liquid petroleum and ash residue can be obtained, and are respectively introduced into the syngas collecting pipe 400, the petroleum collecting pipe 141 and the ash residue barrel 621. Among them, the syngas converged by the syngas collecting pipe 400 can be transported to the gas collecting tank 410 through the gas collecting pump (not shown). The gas collecting tank 410 is equipped with a pressure safety valve (not shown) to regulate the pressure of the gasification reactor 100, the syngas collecting pipe 400 and the gas collecting tank 410 and other systems with gas phase substances to avoid the occurrence of danger. After that, the syngas from the gas collecting tank 410 is further transported to multiple tanks of the purification unit 510 for various treatment steps, such as removing suspended solids, dust, desulfurization, deacidification, cooling, depuration and purification. Finally, the purified syngas is introduced into the gas engine 520 or the boiler and steam engine to generate mechanical energy, which is used to drive generator set 530 to output electricity. Meanwhile, the liquid petroleum 630 produced by pyrolysis oxidation treatment enters the petroleum collecting tank 150, or is transported to a central petroleum storage tank through the petroleum collecting pipe 141 for further treatment and utilization. In this embodiment, eight units are arranged in radial arrays. Others can be arranged in parallel or plum blossom arrays or even in upper, middle and lower plural layers according to local condition and the existing space of the plant.

Figure 4:
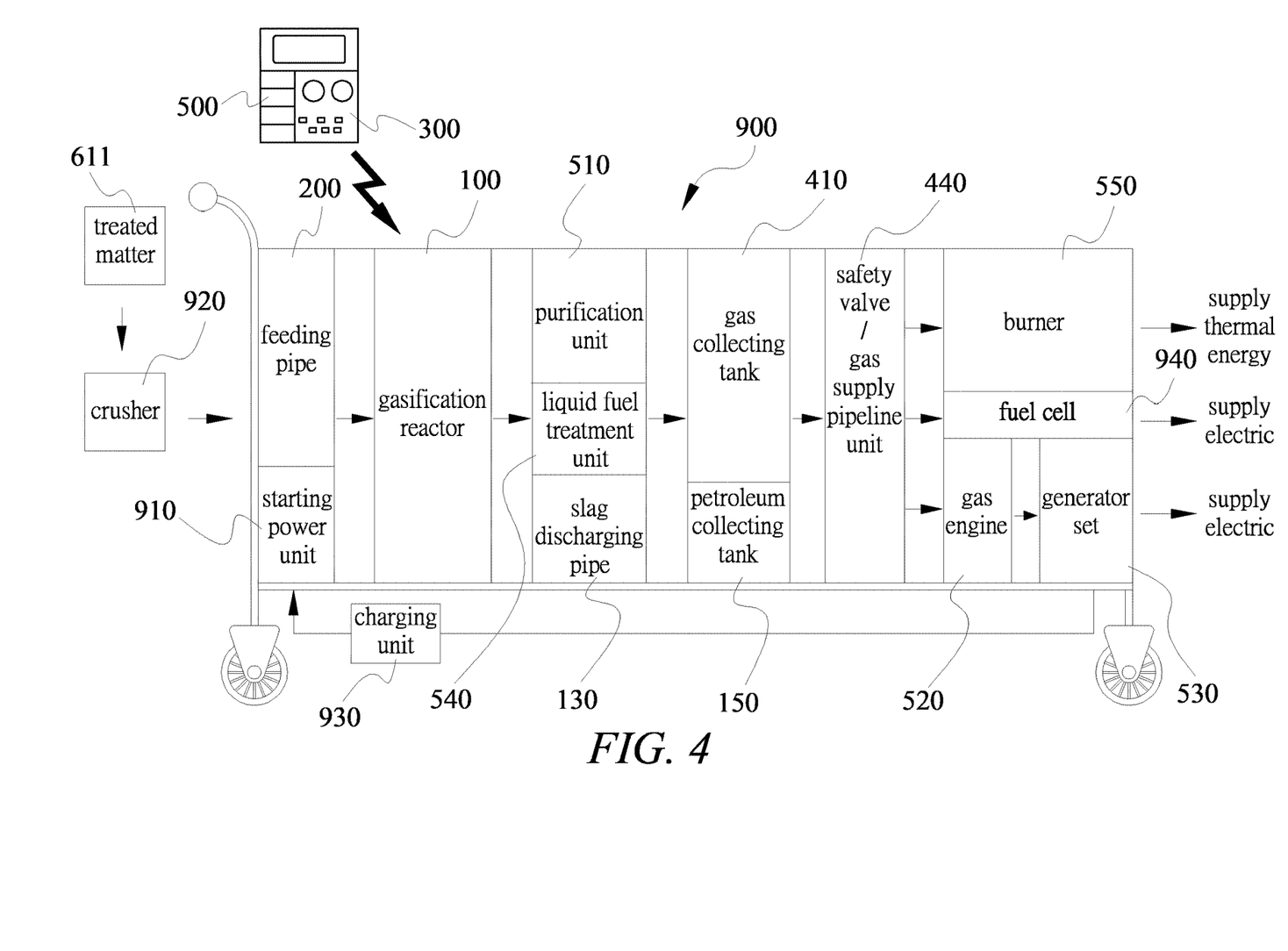
FIG. 4 is a schematic diagram of another embodiment of a movable implementation of the invention.

Referring to FIG. 4, the embodiment is a movable design applicable to various temporary facilities, such as blockhouses or refuge huts in a mountain forest, camping areas, marketplaces and even battlefields. This embodiment is different from the preceding embodiments in that the mobile gasification generator set 900 has its own starting power unit 910, which can be electric power storage equipment or manpower or other power generation facilities. It is assumed that a block-house in the mountain forest, the central control unit 500 is operated by a person who first sets up the operation program, picks up waste such as dead branches or garbage on the spot, feeds it into the crusher 920 to obtain smaller particles of treated matter 611, and then puts it into the feeding pipe 200. After activating the starting power unit 910, the system gives instructions to the gasification reactor 100 according to the program set by this person, and heats of the treated matter 611 which is put into the feed tank and fed into the gasification reactor 100. When the gasification reactor 100 reaches a certain high temperature, the gasification phenomena occur immediately to obtain syngas and some liquid petroleum. The syngas and liquid petroleum obtained are separately purified and treated through its pipeline (not shown) into the syngas purification unit 510 and the liquid fuel (petroleum) treatment unit 540, respectively. The gradually stacked ash residue is discharged from the slag discharging pipe 130. After purification and necessary treatment, the syngas and petroleum products enter the gas collecting tank 410 and the petroleum collecting tank 150 respectively. Alternatively, the syngas obtained from the system can be further purified and supplied to fuel cells 940 for use.

The gas collecting tank 410 and petroleum collecting tank 150 are also equipped with safety valve/gas supply pipeline unit 440 to ensure that the pressure of the system pipeline and tank body is maintained, so that the syngas can be safely and smoothly supplied to the burner 550 to supply thermal energy to gas engine 520 to obtain mechanical energy, which is used to drive the generator set 530 to output electricity. It is worth mentioning that besides directly supplying electrical appliances, the obtained electric energy can be transferred to the starting power unit 910 via charging unit 930, which can be charged continuously to supply electric energy to the battery. That is to say, in the ordinary circumstances of small power consumption, the battery can meet the needs of the small power electrical appliances such as lighting in the block-house, and it can also store and provide sufficient backup power when the mobile gasification generator set 900 is actuated next time. Accordingly, the scale of the system in this embodiment can be designed according to the actual needs. The size of the system depends on the need for use.

Figure 5:
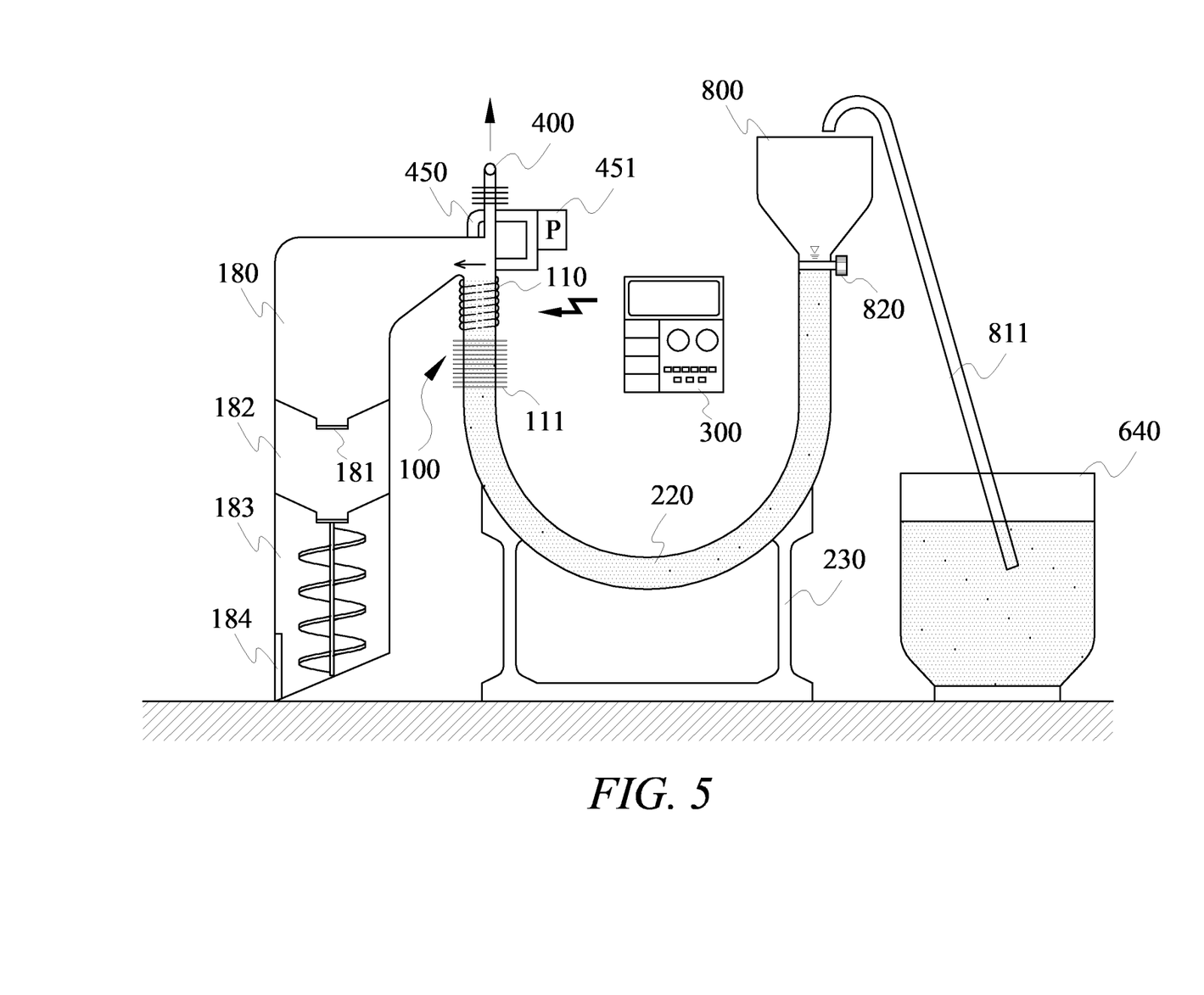
FIG. 5 is a structural schematic diagram of a pyrolysis reaction treatment by feeding from below to above of the invention.

Referring to FIG. 5, the embodiment is illustrated a case of pyrolysis reaction treatment by feeding petroleum sludge or other dense liquid raw material from bottom to top. It also has at least one gasification reactor 100 under which a feeding pipe 220 with a U-shaped connecting pipe structure is connected. On the right side is the feeding end equipped with the raw material hopper 800, which is connected with the raw material tank 640 by the conveying mechanism 811 such as conveyor belt or pipe body. A feeding control valve 820 is arranged below the raw material hopper 800, which is used to make the feeding pipe 220 fixed at the bottom for timing and quantitative feeding. The feeding pipe 220 can be fixed by the support 230 and bend upward when extending to the left side. Starting from the connecting end of the feeding pipe 220 of the gasification reactor 100, air-cooled or water-cooled facilities with heat dissipating fins are respectively arranged from the bottom to the top as the cooling section 111. The heating zone 110 is above the cooling zone 111 and the raw material is pyrolyzed and gasified by high temperature heating with high frequency heater 300.

The top of the heating zone 110 is provided with a syngas collecting pipe 400, and the side of the heating zone 110 is connected with an ash residue accumulation chamber 180. The syngas collecting pipe 400 and the ash residue accumulation chamber 180 can be provided with heat dissipating fins on the air-cooled or water-cooled facilities (not shown), and another suction pipe 450 is arranged beside the syngas collecting pipe 400, as described in the preceding embodiment. The suction pipe 450 bends downward through the ash residue accumulation chamber 180, and the side wall of the heating zone 110 faces the ash residue accumulation chamber 180. The raw material is gasified to produce syngas and ash residue. The syngas is collected by the syngas collecting pipe 400 and directed to a subsequent treatment facility such as another gas collecting tank or purification tank (not shown), etc. Some of the syngas is sucked up by the suction pipe 450 through the pump or pressurization facility 451 and re-entered above the heating zone 110 corresponding to the ash residue pushed upward by the progressive pyrolysis. The ash residue is blown to the ash residue accumulation chamber 180, causing the ash residue to fall and accumulate during the treatment. When the accumulated ash residue reaches a certain amount, the closing valve 181 set at the bottom of the ash residue accumulation chamber 180 can be opened, and the accumulated ash residue can be guided to a buffer chamber 182 below. The buffer chamber 182 is also a closed space and can be equipped with a vacuum well/pump as a buffer for the oxygen-controlled environment of the system. When the ash residue enters the buffer chamber 182 to a certain amount, the closing valve 181 located between the buffer chamber 182 and the ash residue accumulation chamber 180 closes manually or automatically, so as to keep the system from communicating with the outside atmosphere. When the ash residue in the buffer chamber 182 reaches a certain amount, the ash residue can be guided to the slag discharge chamber 183 below the buffer chamber 182 and pushed out from the slag outlet 184 for further treatment or utilization.

The main concept of this embodiment is that the dense raw material in the U-shaped or ⌴-shaped connecting pipe structure of the feeding pipe 220 is liquid fluid, which can properly prevent the atmosphere from entering the reaction end and system. Under the action of atmospheric pressure and its own weight, the fluid-state raw material at the feeding end and the reaction end can be presented at the same horizontal position. During operation, the high frequency heater 300 can be actuated to pyrolyze and heat the raw materials in the heating zone 110 only if the control unit is set in the reaction zone where some of the raw materials are really pushed to the heating zone 110. Because there is a cooling zone 111 below the heating zone 110, the high temperature thermal energy will not all be transferred to the raw material in the feeding pipe 220. At the same time, the ash residue after high temperature gasification can be prevented from falling back to the raw material pile because the top of the gasification reactor 100 can be equipped with a filter screen (not shown). In this way, the system can feed the raw material into the feeding pipe 220 manually or automatically through the feeding control valve 820 timely and quantitatively, so that the height of the raw material at the left and right ends can be maintained at a certain level because of the principle of the connecting pipe, and the raw materials can be continuously pushed to the heating zone 110 for pyrolysis gasification treatment.

This embodiment makes full use of the characteristics of dense fluid of petroleum sludge and other raw materials, cooperates with atmospheric pressure and gravity, has little mechanical structure and action, but has great benefit. It is indeed an ideal invention and creation.

Figure 6:
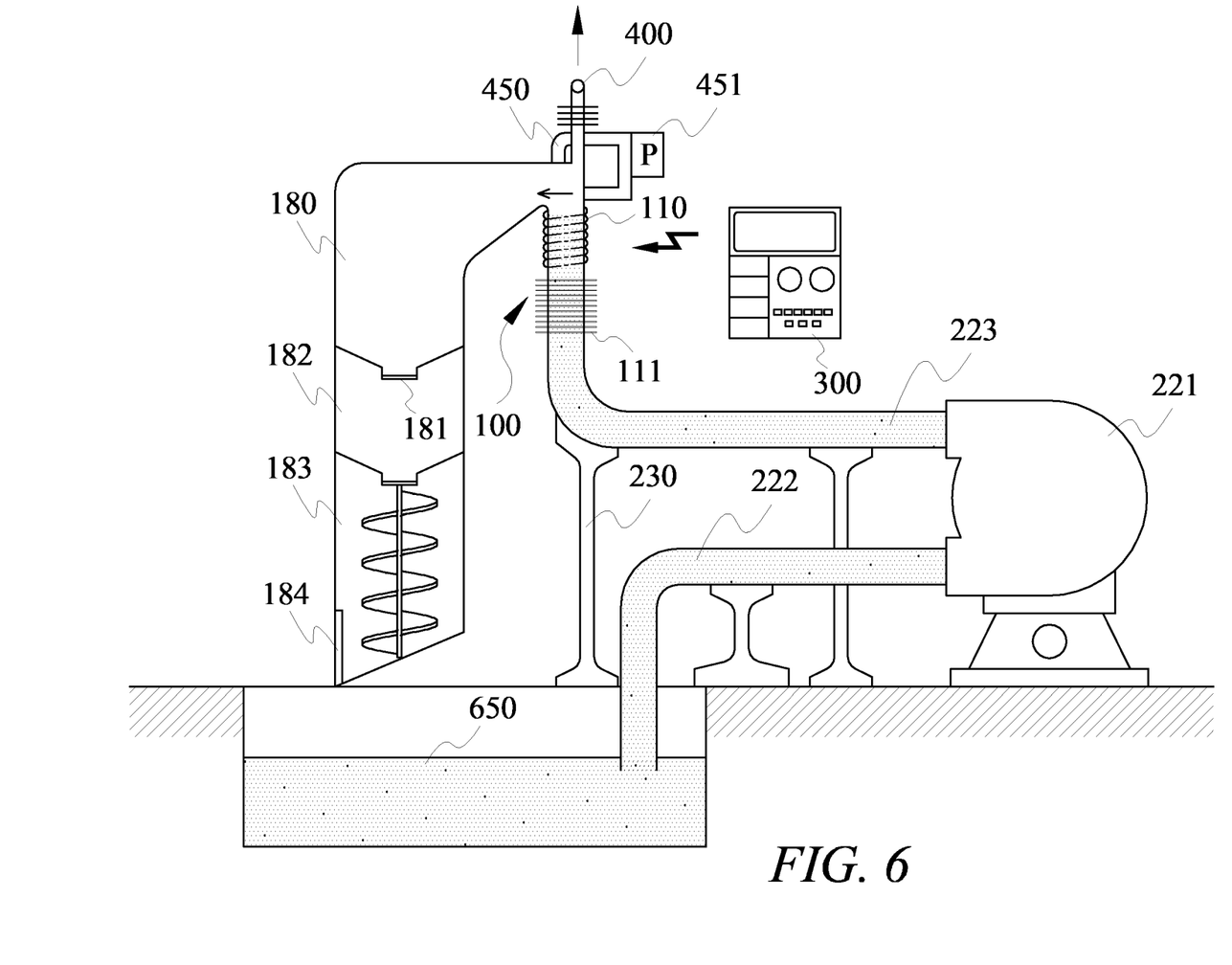
FIG. 6 is a structural schematic diagram of a pyrolysis reaction treatment by feeding with feeding pump from below to above of the invention.

Referring to FIG. 6, the embodiment is also illustrated a case of pyrolysis reaction treatment by feeding raw material from below to above. The main structure is the same as that of the embodiment of FIG. 5. The main difference lies in using a feeding pump 221 to suck up the raw material from the petroleum sludge tank 650 and through the feeding pipe 222 entering into the discharging pipe 223. The tail end of the discharge pipe 223 is bent upward and connected to the gasification reactor 100. The gasification reactor 100 is divided into cooling zone 111 and heating zone 110 from the bottom to the top of the connection end of the discharging pipe 223, respectively. The cooling zone 111 is used to cool the raw material by heat dissipation fins or water cooling system. The remaining structures are the same as the embodiment in FIG. 5, and will not repeat the description here.

In summary, the petroleum sludge or other wastes recycle treatment system of the invention is quite different from the traditional burial and incineration in design, and has great novelty and progressiveness. By using the treatment system of the invention, waste is no longer garbage, but a new energy source. As mentioned earlier, the International Energy Agency (IEA) has defined the waste generated by human civilization as the fourth largest energy source. If human beings make good use of this fourth largest energy source, they can gradually slow down the development of natural resources, and do not need to continue to destroy the earth and nature. After many tests on the prototype, the inventor obtained a large amount of syngas, which proved to be feasible. Moreover, the cost of construction, operation and maintenance of the unit is much lower than that of "plasma gasification" technology being developed in advanced countries such as Europe, America and Japan. High frequency heating technology has been very mature for more than 20 years. For example, microwave oven, metal welding, melting furnace and surface hardening treatment have been widely used, and there are many professional books or documents, but it is not found in the research and implementation of waste gasification treatment. Under such space-time conditions, the system of the invention has proved to be of great practical value in establishing the scale of commercial operation and should have conformed to the requirements of national patents. Therefore, it is our expectation to apply for approval in accordance with the law so as to facilitate the early implementation of production and contribute to the protection of the worsening global environment and the promotion of circular economy.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. Petroleum sludge or other wastes recycle treatment system used to treat dense raw material such as petroleum sludge, comprising:
   a power supply, a central control unit, a raw material hopper, and at least one gasification reactor; each of the at least one gasification reactor including
   a feeding pipe that is connected to the raw material hopper from each of the at least one gasification reactor, and feeding raw material from below to each of the at least one gasification reactor above;
   a high frequency heater that provides electric field to heat a heating zone of each of the at least one gasification reactor, so that the raw material in each of the at least one gasification reactor is pyrolyzed after heating to produce syngas;
   wherein an ash residue accumulation chamber is arranged on a side of the heating zone;
   a buffer chamber that is a closed type and arranged below the ash residue accumulation chamber;
   a slag discharge chamber that is arranged below the buffer chamber in which a vacuum well/pump is equipped to maintain an oxygen-controlled environment of the system;
   a syngas collecting pipe that is arranged on the top of the heating zone to transport the syngas obtained to each of treatment tanks and a gas collecting tank.
   a suction pipe and a pump that are arranged on the top of the heating zone beside the syngas collecting pipe, the suction pipe penetrating into a side wall of each of the at least gasification reactor and opening in each of the at least gasification reactor, and being pressurized by the pump to blow gas inward;

an air-cooled or a water-cooled facility that is arranged at the feeding end section below each of the at least one gasification reactor.

2. The petroleum sludge or other wastes recycle treatment system of claim 1, wherein the feeding pipe is a connecting pipe structure, which continuously pushes the raw material from below to upper of each of the at least one gasification reactor.

3. The petroleum sludge or other wastes recycle treatment system of claim 1, wherein the feeding pipe transports the raw material by a feeding pump and continuously pushes the raw material from below to above of each of the at least one gasification reactor.

4. The petroleum sludge or other wastes recycle treatment system of claim 1, wherein the suction pipe is bifurcated out from a gas collecting pipe.

\* \* \* \* \*